AIR CONDITIONING SYSTEM INCLUDING REHEAT COILS

Original Filed Jan. 11, 1966

INVENTOR:
RODNEY F. LAUER,
BY Robert W. Palmer
ATTORNEY

AIR CONDITIONING SYSTEM INCLUDING REHEAT COILS

Original Filed Jan. 11, 1966

INVENTOR:
RODNEY F. LAUER,
BY Robert J. Palmer
ATTORNEY

United States Patent Office

Re. 26,593
Reissued May 27, 1969

26,593
AIR CONDITIONING SYSTEM INCLUDING REHEAT COILS

Rodney F. Lauer, Naples, Fla., assignor to Westinghouse Electric Corporation, Pittsburgh, Pa., a corporation of Pennsylvania Original No. 3,316,730, dated May 2, 1967, Ser. No. 519,901, Jan. 11, 1966. Application for reissue June 5, 1968, Ser. No. 741,818
Int. Cl. F25b *41/00;* F24f *3/14*
U.S. Cl. 62—160 6 Claims

Matter enclosed in heavy brackets [ ] appears in the original patent but forms no part of this reissue specification; matter printed in italics indicates the additions made by reissue.

*ABSTRACT OF THE DISCLOSURE*

*In an air conditioning system in which air is chilled for dehumidification to a temperature too low for comfort, a reheat coil downstream with respect to the evaporator coil, is connected when reheat is required, to the compressor of the system so as to act as an auxiliary condenser coil for heating the air chilled by the evaporator coil. The reheat coil discharges refrigerant liquid through an expansion device into the evaporator coil which is fed by the main condenser coil through a sub-cooling control valve operating as an expansion valve.*

This invention relates to air conditioning systems in which reheat is used for increasing the sensible heat of air which has been chilled, for dehumidification, to a temperature which is too low for comfort, and has as an object to improve such systems.

In many locations, the wet bulb temperature of the outdoor air is frequently so high that where the utmost in comfort is desired, it is necessary to operate an air cooling system to chill the air to be cooled below its dew point temperature, and then to reheat the air to a comfortable temperature. This has been accomplished in many ways, including using the heat in recirculated air in so-called "by-pass systems," and using the heat for condensers of refrigeration systems. This invention improves the latter-systems.

In one embodiment of this invention using a non-reversible refrigeration system, an expansion valve, preferably a sub-cooling control valve, meters refrigerant liquid to an associated evaporator coil at the rate at which refrigerant is condensed in an associated condenser coil. This results in over feeding the evaporator coil, and to prevent refrigerant liquid from flowing into the associated compressor, the gas and unevaporated refrigerant from the evaporator is flowed into an accumulator in which gas is separated from the liquid and supplied to the suction side of the compressor. The liquid from the condenser coil flows through a heat exchange coil within the accumulator before it is supplied to the sub-cooling control valve, the heat from the high pressure liquid flowing through such coil evaporating the excess refrigerant liquid flowing from the evaporator coil into the accumulator. A reheat coil is connected through a solenoid-controlled valve to the discharge side of the compressor, and when reheat is required, the solenoid-controlled valve is opened to supply discharge gas into the reheat coil to operate it as an auxiliary condenser coil. The reheat coil is connected to the evaporator coil through a fixed restrictor which may be a capillary tube. Thus, when reheat is required, the reheat coil and its restrictor are connected in parallel with the condenser coil and its sub-cooling control valve.

In a heat pump embodying this invention, the operation is that described in the foregoing during cooling operation. During heating operation, the reheat coil operates continuously as a condenser coil, aiding in heating the indoor air.

Figure 1:
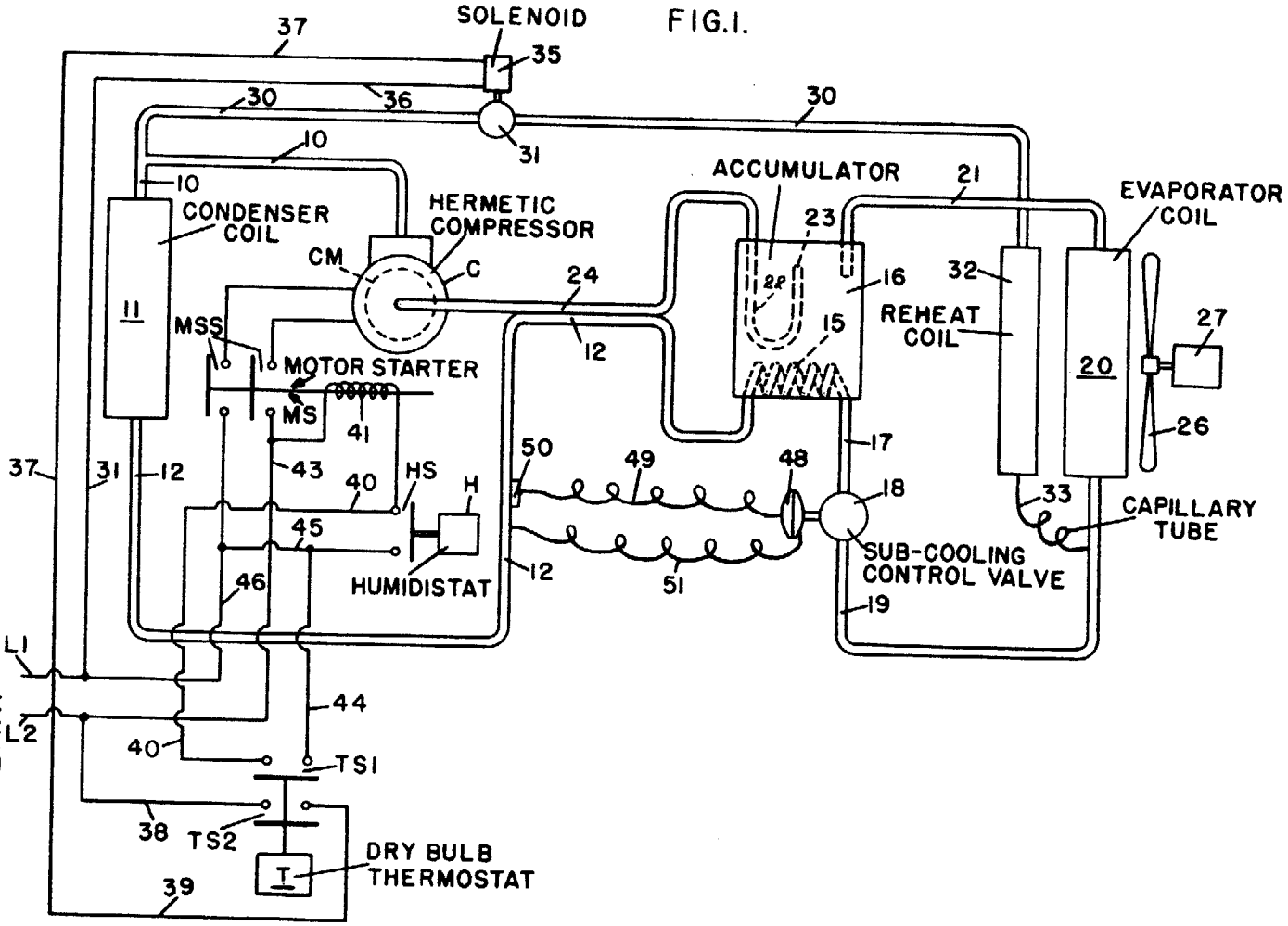
Figure 2:
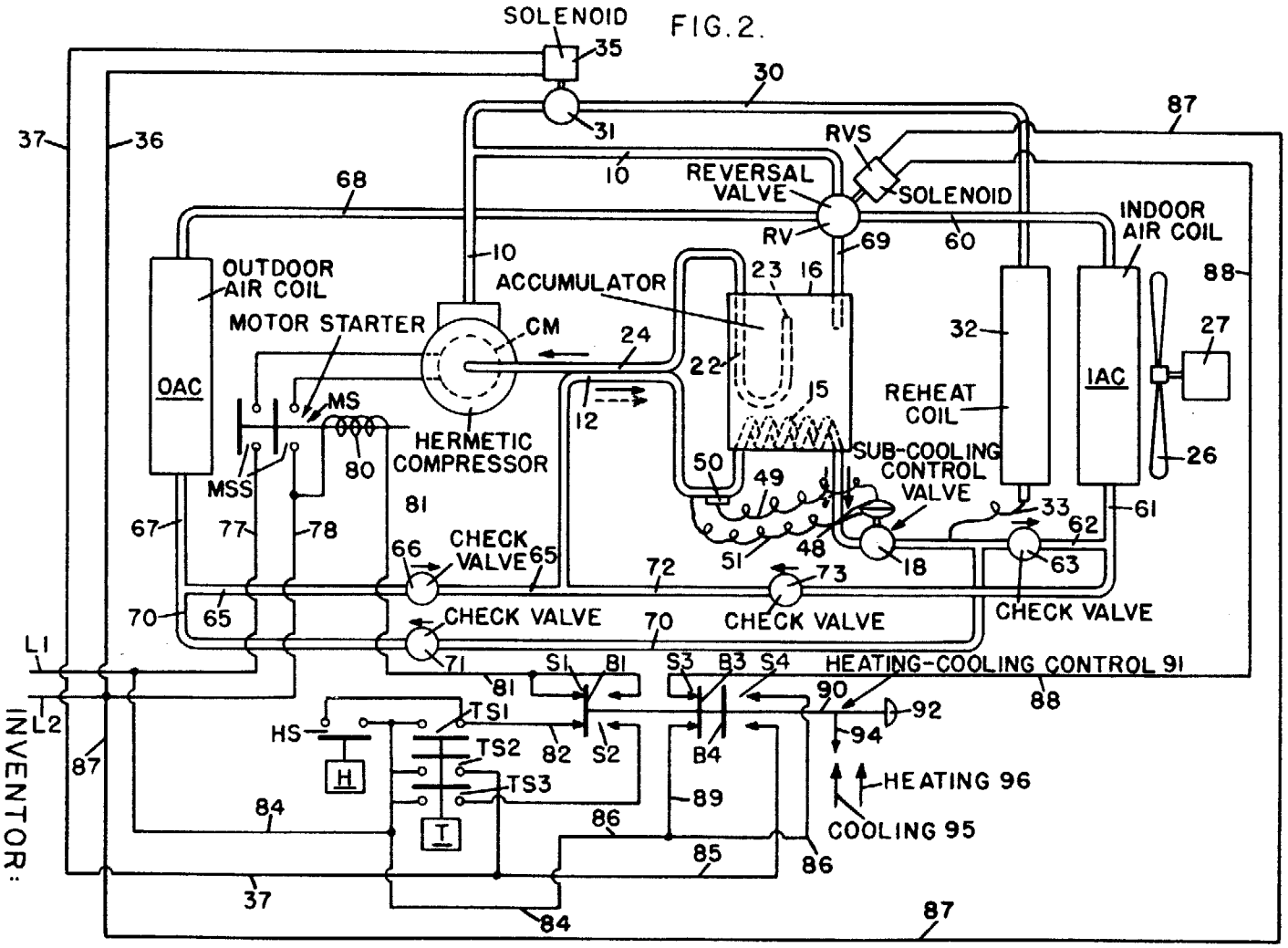

This invention will now be described with reference to the annexed drawings, of which:

FIG. 1 is a diagrammatic view of an air conditioning system using a non-reversible refrigeration system, embodying this invention, and FIG. 2 is a diagrammatic view of a heat pump embodying this invention.

Description of FIG. 1

The discharge side of a hermetic refrigerant compressor C, driven by an enclosed electric motor CM, is connected by discharge gas tube 10 to one end of condenser coil 11, the other end of which is connected by tube 12, heat exchange coil 15 within the lower portion of accumulator 16, tube 17, sub-cooling control valve 18 and tube 19 to one end of evaporator coil 20. The other end of the coil 20 is connected by tube 21 to the upper portion of the accumulator 16. U-shaped tube 22 within the accumulator 16 has an open upper end 23, and its other end is connected by suction gas tube 24 to the suction side of the compressor C. Portions of the tubes 12 and 24 are in heat exchange contact.

A fan 26 driven by an electric motor 27, moves indoor air to be cooled over the evaporator coil 20. A fan which is not shown, could be used to move outdoor air over the condenser coil 11 when the latter is an air cooled coil.

The discharge gas tube 10 is also connected through tube 30 and valve 31 to one end of reheat coil 32, the other end of which is connected through a restrictor 33 shown as a capillary tube, to the tube 19. The restrictor 33 could be a high pressure float or a steam trap. The reheat coil 32 is adjacent to and downstream with respect to air flow, of the evaporator coil 20.

The valve 31 is adjusted by a solenoid 35 which is connected by wire 36 to electric supply line L1, and by wire 37 to switch TS2 of dry bulb thermostat T. The switch TS2 is connected by wire 38 to electric supply line L2. Switch TS1 of the thermostat T is connected by wire 40 to switch HS or humidistat H, and to one end of winding 41 of compressor motor starter MS, the other end of which is connected by wire 43 to the line L2. The switch TS1 is connected by wire 44 to the switch HS, and by wires 45 and 46 to the line L1. The switch TS1 of the thermostat T, and the switch HS of the humidistat H are connected in parallel with each other, and in series with the motor starter winding 41 to the lines L1 and L2 so that either switch, when closed, can energize the starter MS. The starter MS has switches MSS which connect, when closed, through the wires 46 and 43, the compressor motor CM to the lines L1 and L2.

The sub-cooling control valve 18 has a diaphragm chamber 48, the outer portion of which is connected by capillary tube 49 to thermal bulb 50 in heat exchange contact with the tube 12, and the inner portion of which is connected by capillary tube 51 to the interior of the tube 12. The valve 18, the details of which are disclosed in the U.S. Patent No. 3,171,262 of J. R. Harnish which issued on March 2, 1965, responds to the temperature and pressure of the high pressure refrigerant within the tube 12, and meters refrigerant to the evaporator coil 20 at the rate at which the refrigerant is condensed within the condenser coil 11, while maintaining a predetermined amount of sub-cooling in the condensed refrigerant.

Operation of FIG. 1

The motor starter MS is energized by the closing of the humidistat switch HS when the relative humidity of the indoor air is above, for example, 50% or by the closing of the thermostat switch TS1 when the indoor temperature increases above, for example 80° F., and closes its switches MSS, starting the compressor motor CM. Discharge gas is supplied from the compressor C through the tube 10 into the condenser coil 11. Liquid flows from the coil 11 through the tube 12, the coil 15 within the accumulator 16, the sub-cooling control valve 18 and the tube 19 into the evaporator coil 20. The valve 18 operates to supply to the coil 20 all of the refrigerant condensed within the condenser coil 11 while maintaining, for example, 10° F. sub-cooling of the liquid flowing from the coil 11 at a condensing temperature of 100° F., and is preferred for this reason. However, a conventional expansion valve controlled by a high pressure pilot float meters refrigerant at the rate at which it is condensed, and may be used, without the sub-cooling advantage. The evaporator coil 20 is overfed by the valve 18 so that gas and unevaporated refrigerant liquid flow from the evaporator coil into the accumulator where the excess refrigerant liquid is evaporated by heat from the high pressure liquid flowing through the coil 15, the liquid being further subcooled by this action. Gas separated from the liquid within the accumulator flows through the suction gas tube 24 to the suction side of the compressor C. Any liquid which may enter the tube 24 is evaporated by the heat exchanger between the contacting portions of the tubes 12 and 24, the liquid flowing through the tube 12 being further subcooled by this action.

When the humidistat H is in control of the compressor C, the indoor air may be chilled to such a low temperature that reheat is required. When this happens, the switch TS2 closes at, for example, 78° F., and energizes the solenoid 35 which opens the valve 31 to supply discharge gas from the compressor C through the tube 30 into the reheat coil 32 to operate the latter as an auxiliary condenser for heating the indoor air chilled by the evaporator coil 20. The refrigerant condensed within the reheat coil 32 is expanded through the restrictor 33, and is supplied into the evaporator 20. The heat from the coil within the accumulator 16 evaporates the excess refrigerant liquid fed from both the reheat coil 32 and the condenser coil 11. Advantages of overfeeding the evaporator are that its internal surfaces are thoroughly wetted, and distribution is not critical. Therefore, its efficiency is increased. There is no energy loss in evaporating the excess refrigerant liquid by heat from the high pressure liquid flowing through the coil 15 within the accumulator 16 since such high pressure liquid is subcooled by this action.

Description of FIG. 2

Those components of FIG. 2 which correspond to components of FIG. 1 are given the same reference characters.

Compressor motor CM drives compressor C. The latter is connected by tube 10 to a conventional reversal valve RV, adjustable by a solenoid RVS. The valve RV is connected by tube 60 to one end of indoor air coil IAC, the other end of which is connected by tube 61, tube 62 containing a check-valve 63, and sub-cooling control valve 18 to the outlet of coil 15 within accumulator 16. The valve 18 has a diaphragm chamber 48, the upper portion of which is connected by a capillary tube 49 to thermal bulb 50 in contact with tube 12, and the lower portion of which is connected by capillary tube 51 to the interior of the tube 12. The inlet of the coil 15 is connected by tube 12, tube 65 containing a check-valve 66, and tube 67 to one end of outdoor air coil OAC, the other end of which is connected by tube 68 to the valve RV. The valve RV is connected by tube 69 to the upper portion of the accumulator 16. The accumulator 16 contains a U-shaped tube 22 having an open upper end 23, with its other end connected by suction gas tube 24 to the suction side of the compressor C.

Portions of the tubes 12 and 24 are in heat exchange contact. A tube 30 containing a valve 31 adjustable by a solenoid 35 is connected to the tube 10 and to one end of reheat coil 32, the other end of which is connected by restrictor 33 to the tube 62 between the valve 18 and the check-valve 63. The tube 67 is connected by tube 70 containing a check-valve 71 to the tube 62 between the valve 18 and the check-valve 63. The tube 65 is connected by tube 72 containing a check-valve 73, to the tube 61. The reheat coil is located adjacent to and downstream of the indoor air coil IAC. A fan 26 driven by an electric motor 27, moves indoor air over the coils IAC and 32. A fan, which is not shown, could be used to move outdoor air over the outdoor air coil OAC.

The compressor motor CM is connected by wires 77 and 78, and switches MSS of starter MS to electric supply lines L1 and L2 respectively. The starter MS has an energizing winding 80 connected by the wire 78 to the line L2, and connected by wire 81 to switches S1 and S2. The switch S1 is also connected by wire 82 to switch TS1 of indoor thermostat T which is connected across switch HS of indoor humidistat H. The switches TS1 and HS are connected in parallel with each other and in series with the switch S1 and the winding 80 of the motor starter MS to the supply lines L1 and L2. The solenoid 35 is connected by wire 36 to the line L2, and by wire 37 to switch TS2 of the thermostat T, which switch is connected by wire 84 to the line L1. Switch S4 is connected by wire 85 to the wire 37, and by wire 86 and the wire 84 to the line L1. The reversal valve solenoid RVS is connected by wire 87 to the line L2, and by wire 88 to switch S3 which is connected by wire 89 and the wires 86 and 84 to the line L1. Switch TS3 of the thermostat T is connected to the wire 84 and to the switch S2.

The switch S1 is closed by switch blade B1 attached to insulator rod 90 of cooling-heating control 91, when control knob 92 on the right end of the rod 90 is adjusted to place the control 91 in cooling position as shown by FIG. 2. The switch S2 is on the opposite side of the blade B1 from the switch S1, and is adapted to be closed by the blade B1 when the control knob 92 is moved to the right of the position shown by FIG. 2, to adjust the control 91 to heating position. The switch S3 is closed by switch blade B3 when the control 91 is in its cooling position as shown by FIG. 2. The switch S4 is adapted to be closed by switch blade B4 when the control 91 is in its heating position. The blades B3 and B4 are also attached to the rod 90. An indicator arrow 94 on the rod 90 is opposite a fixed indicator arrow 95 when the control 91 is in cooling position as shown by FIG. 2, and is opposite a fixed indicator arrow 96 when the control 91 is in its heating position.

The reversal valve RV is of the type which, when its solenoid RVS is deenergized, is in its heating position, and when its solenoid is energized is in its cooling position.

Operaton of FIG. 2

When indoor air cooling is desired, the control 91 is placed in its cooling position as shown by FIG. 2. The switches S1 and S3 are closed, and the switches S2 and S4 are open. The switch S1 connects the thermostat switch TS1 and the humidistat switch HS to control the compressor motor starter MS. The switch S3 energizes the reversal valve solenoid RVS which adjust the reversal valve RV to its cooling position. The starter MS is energized by the closing of the switch HS when the relative humidity of the indoor air is too high, or by the closing of the switch TS1 when the temperature of the indoor air is too high, and starts the compressor motor CM. Discharge gas from the compressor C flows through the tube 10, the reversal valve RV and the tube 68 into the outdoor air coil OAC operating as a condenser coil. Condensed refrigerant flows from the coil OAC through the tube 67, the tube 65, the check-valve 66, the tube 12, the coil 15, the subcooling control valve 18, the tube 62, the check-valve 63 and the tube 61 into the indoor air coil IAC operating as an evaporator coil. Gas and unevaporated refrigerant flow from the coil IAC through the tube 60, the reversal valve RV and the tube 69 into the accumulator 16. Gas separated from the liquid within the accumulator flows through the tube 22 and the suction gas tube 24 to the suction side of the compressor C. The subcooling control valve 18, and the coil 15 operate as described in the foregoing in connection with the operation of FIG. 1.

When reheat is required, the thermostat switch TS2 closes and energizes the solenoid 35 which opens the valve 31, supplying discharge gas from the tube 10 through the tube 30 into the reheat coil 32, operating the latter as a condenser coil for heating the air blown by the fan 26 over the indoor air coil IAC. Refrigerant condensed in the reheat coil 32 is expanded through the restrictor 33 and flows through the tube 62 and check-valve 63 into the indoor air coil IAC which is operating as an evaporator. Gas and unevaporated refrigerant flow from the coil IAC into the accumulator 16 and from there the gas separated from the liquid flows to the suction side of the compressor as described in the foregoing.

When indoor air heating is required, the control 91 is placed in its heating position by moving the control knob 92 to the right so that the indicator arrow 94 lines up with the indicator arrow 96. The switches S1 and S3 are opened, and the switches S2 and S4 are closed. The now open switch S1 disconnects the thermostat switch TS1 and the humidistat switch HS from control of the motor starter MS. The open switch S3 deenergizes the reversal valve solenoid which adjusts the reversal valve RV to its heating position. The closed switch S2 connects the thermostat switch TS3 to control the starter MS. The closed switch S4 energizes the solenoid 35 which opens the valve 31 so that discharge gas is supplied into the reheat coil 32 to operate it as a condenser coil during all of the heating operation.

When the thermostat T calls for heat, the switch TS3 closes and energizes the motor starter MS which closes its switches MSS, starting the compressor motor CM. Discharge gas flows from the compressor C through the tube 10, the reversal valve RV and the tube 60 into the indoor air coil IAC operating as a condenser coil. Refrigerant condensed within the coil IAC flows through the tubes 61 and 62, the check-valve 73, the tube 12, the coil 15 within the accumulator 16, the tube 62, the subcooling control valve 18, the tube 70, the check-valve 71 and the tube 67 into the outdoor air coil OAC operating as an evaporator coil. Discharge gas also flows from the tube 10 through the tube 30 and the valve 31 into the reheat coil 32 operating as a condenser coil. Refrigerant condensed in the reheat coil 32 is expanded in the restrictor 33, and flows through the tube 70, the check-valve 71 and the tube 67 into the outdoor air coil OAC operating an an evaporator coil. Gas and unevaporated refrigerant flow from the coil OAC through the tube 68, the reversal valve RV and the tube 69 into the accumulator 16. Gas separated from the liquid within the accumulator 16 flows through the tubes 22 and 24 to the suction side of the compressor C. The subcooling control valve 18, and the coil 15 within the accumulator 16 operate as described in the foregoing in the description of FIG. 1.

The reheat coil 32 operating as a condenser coil, adds its heat to that provided by the indoor air coil IAC operating as a condenser coil, facilitating the heating of the indoor air.

What is claimed is:

1. An air cooling system comprising a refrigerant compressor; a condenser coil; an evaporator coil; a discharge gas tube connecting said compressor to said condenser coil; accumulator means; [a heat exchange coil arranged to heat liquid within said accumulator means;] a suction gas tube connecting said accumulator means to said compressor; [a liquid tube connecting said condenser coil to said heat exchange coil;] an expansion valve; *means including a liquid tube connecting said condenser coil to said expansion valve;* [a fourth tube connecting said heat exchange coil to said valve;] a [fifth] *fourth* tube connecting said valve to said evaporator coil; a [sixth] *fifth* tube connecting said evaporator coil to said accumulator means; means for moving air to be cooled over said evaporator coil; a reheat coil adjacent to and downstream with respect to air flow of said evaporator coil; a [seventh] *sixth* tube connecting said discharge gas tube to said reheat coil; a normally closed valve in said [seventh] *sixth* tube; expansion means connecting said reheat coil to said [fifth] *fourth* tube; means for opening said normally closed valve when reheat is required and for reclosing said normally closed valve when no reheat is required; [and] means for adjusting said expansion valve to supply refrigerant from said [heat exchange] *condenser* coil to said evaporator coil at the rate at which refrigerant is condensed in said condenser coil*; and means for evaporating refrigerant liquid flowing from said evaporator coil with heat from the high pressure liquid flowing through said liquid tube.*

2. An air cooling system as claimed in claim 1 in which said expansion valve is a subcooling control valve, and in which said means for adjusting said expansion valve responds to the pressure and the temperature of the refrigerant in said liquid tube.

3. A heat pump for conditioning indoor air, comprising a refrigerant compressor; an outdoor coil; an indoor coil; accumulator means; [a heat exchange coil arranged to heat liquid within said accumulator means;] means for moving indoor air over said indoor coil; a reheat coil adjacent to and downstream with respect to air flow of said indoor coil; an expansion valve; expansion means; control means; means including said control means when air cooling is required, for directing refrigerant from said compressor in a first circuit through said outdoor coil operating as a condenser, [said heat exchange coil,] said expansion valve; said indoor coil operating as an evaporator, and said accumulator means to said compressor; means including said control means when reheat is required while refrigerant is flowing in said first circuit, for directing refrigerant from said compressor through said reheat coil and said expansion means into said indoor coil; means including said control means when air heating is required, for directing refrigerant from said compressor in a second circuit through said indoor coil operating as a condenser, [said heat exchange coil] and said expansion valve into said outdoor coil operating as an evaporator, and from said compressor through said reheat coil and said expansion means into said outdoor coil, from said outdoor coil into said accumulator means, and from said accumulator means to said compressor; [and] means for adjusting said expansion valve to supply refrigerant to said indoor coil when it is operating as an evaporator and said outdoor coil is operating as a condenser, at the rate at which refrigerant is condensed in said outdoor coil, and to supply refrigerant to said outdoor coil when it is operating as an evaporator and said indoor coil is operating as a condenser, at the rate at which refrigerant is condensed in said indoor coil, *and means for evaporating refrigerant liquid flowing from the one of said indoor or outdoor coils operating as an evaporator with heat from the high pressure liquid flowing from the one of said outdoor or indoor coils operating as a condenser.*

4. A heat pump as claimed in claim 3 in which said expansion valve is a subcooling control valve, and in which said means for adjusting said expansion valve responds to the pressure and the temperature of the refrigerant flowing [into said heat exchange coil] *from the one of said outdoor or indoor coils that is operating as a condenser.*

5. A heat pump for conditioning indoor air, comprising a refrigerant compressor; refrigerant reversal means; a discharge gas tube connecting said compressor to said reversal means; an outdoor coil; an indoor coil; accumulator means; a heat exchange coil arranged to heat liquid within said accumulator means; a suction gas tube connecting said accumulator means to said compressor; a third tube connecting said reversal means to said accumulator means; a fourth tube connecting said reversal means to said outdoor coil; a fifth tube containing first check-valve means connecting said outdoor coil to said heat exchange coil; an expansion valve; a sixth tube connecting said heat exchange coil to said expansion valve; a seventh tube containing second check-valve means connecting said expansion valve to said indoor coil; an eighth tube connecting said indoor coil to said reversal means; means for moving air over said indoor coil; a reheat coil adjacent to and downstream with respect to air flow of said indoor coil; a ninth tube containing a normally closed valve connecting said discharge gas tube to said reheat coil; means including expansion means connecting said reheat coil to said seventh tube between said expansion valve and said second check-valve means; a tenth tube containing third check-valve means connecting said seventh tube between said expansion valve and said second check-valve means to said fifth tube between said first check-valve means and said outdoor coil; an eleventh tube containing fourth check-valve means connecting said seventh tube between said second check-valve means and said indoor coil to said fifth tube between said first check-valve means and said heat exchange coil; means for adjusting said reversal means to cooling position for routing discharge gas from said discharge gas tube through said fourth tube into said outdoor coil to operate the latter as a condenser; means for opening said normally closed valve when reheat is required while said reversal means is in cooling position, for routing discharge gas from said discharge gas tube through said ninth tube into said reheat coil to operate the latter as a condenser, and for reclosing said normally closed valve when no reheat is required; means for concurrently opening said normally closed valve and adjusting said reversal means to heating position for routing discharge gas from said discharge gas tube through said eighth tube into said indoor coil and through said ninth tube into said reheat coil for operating said indoor and reheat coils as condensers; and means for adjusting said expansion valve to supply refrigerant to said indoor coil while said outdoor coil is operating as a condenser at the rate at which refrigerant is condensed in said outdoor coil, and to supply refrigerant to said outdoor coil while said indoor coil is operating as a condenser at the rate at which refrigerant is condensed in said indoor coil.

6. A heat pump as claimed in claim 5 in which said expansion valve is a subcooling control valve, and in which said means for adjusting said expansion valve responds to the pressure and the temperature of the refrigerant flowing into said heat exchange coil.

References Cited

The following references, cited by the Examiner, are of record in the patented file of this patent or the original patent.

UNITED STATES PATENTS

| | | | |
|---|---|---|---|
| 2,770,100 | 11/1956 | Raney | 62—173 |
| 2,952,989 | 9/1960 | Gould | 62—173 |
| 3,264,840 | 8/1966 | Harnish | 62—173 |

WILLIAM J. WYE, *Primary Examiner.*

U.S. Cl. X.R.

62—173, 176, 203; 165—21, 30